Figure 1:
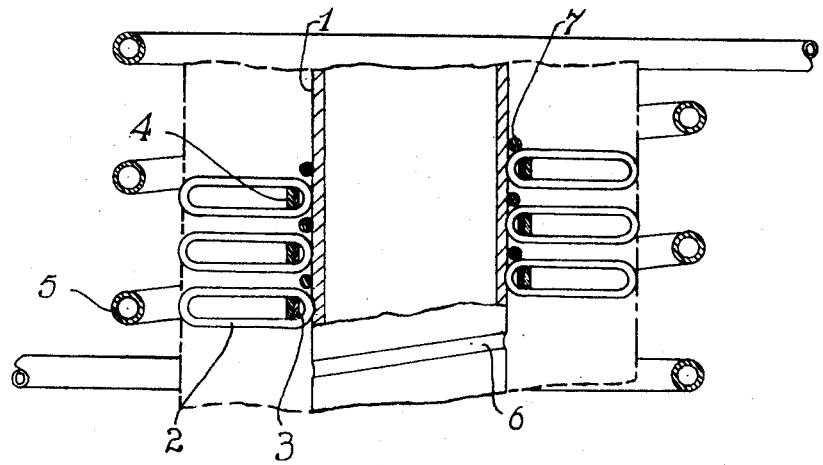

Aug. 9, 1960  A. J. WALL  2,948,796
HEAT TRANSMITTING TUBES
Filed April 30, 1958

Inventor
ALAN JAMES WALL

By Norris & Bateman
Attorneys

United States Patent Office 2,948,796
Patented Aug. 9, 1960

2,948,796

HEAT TRANSMITTING TUBES

Alan J. Wall, Lincoln, England, assignor to Clayton Dewandre Company Limited, Lincoln, England Filed Apr. 30, 1958, Ser. No. 731,903

Claims priority, application Great Britain May 24, 1957

6 Claims. (Cl. 219—9.5)

This invention relates to heat transmitting tubes for use in heat exchangers and of the kind provided with heat transfer elements in the form of a wire coil or spiral extending helically around the tube, said coil being wound upon the tube with the aid of a binding wire extending through the coil and being bonded to the tube by soldering.

In the production of such tubes, soft (lead-tin) solder is commonly used but when the temperatures of the fluids involved in the heat exchange are above the melting point of soft solder a bonding material of higher melting point has to be employed, examples of such materials being silver solder, copper and, in the case of aluminium and its alloys, aluminium-silicon and the so-called "hard" aluminium solders. The higher melting points of these bonding materials preclude the use of high-pressure steam as a heating medium and a convenient alternative is high frequency induction heating, the wound tube being passed at a controlled rate through a heating coil whose dimensions are determined by the type and size of the tube. In the past, however, this method of heating has not been entirely satisfactory. The maximum intensity of heat is required at the surface of the tube where the solder is applied and where the bases of the wire loops contact the tube, but as the binding wire is also in the same region, it therefore tends to heat up more quickly than the heavier mass of the tube with resultant differential expansion between said wire and the tube. This, in turn, reduces materially the tension in the binding wire and results in a slackening of the loops themselves with a risk of the loops being displaced from their correct positions and a consequential loss of heat transfer efficiency in the finished articles.

The object of the present invention is to provide an improved method of bonding the wire coil to the tube which overcomes the defects above mentioned and ensures maximum efficiency of heat exchange.

According to the invention, therefore, the method of applying the wire winding to heat transmitting tubes of the kind referred to and for use in high temperature heat exchange comprises feeding both a binding wire and a bonding wire of solder or brazing metal through the wire coil during the winding operation and thereafter passing the assembly through a high frequency induction coil to cause the solder to melt and flow over the bases of the wire loops and the surface of the tube, the bonding wire being of such cross section and so positioned within the coil that it screens the binding wire from the electromagnetic field produced by the heating coil whereby the temperature of the binding wire is maintained substantially at the temperature of the tube wall.

Figure 2:
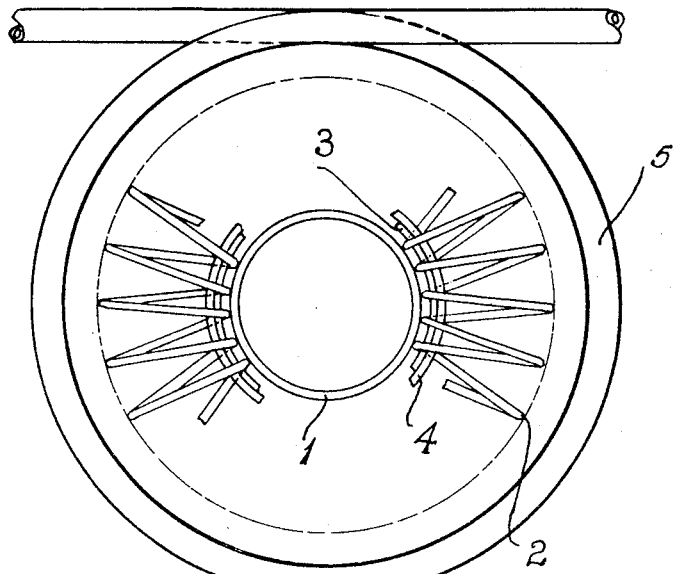

The preferred method of carrying the invention into effect will now be described with reference to the accompanying drawings wherein:

Fig. 1 is an axial section through a portion of a heat transmitting tube and the heating means therefor during a stage in the production of the tube, and Fig. 2 is an end view of Fig. 1.

In the drawings, 1 indicates the basic tube upon which is wound helically and in known manner a heat transfer element in the form of a flattened wire coil or spiral 2, the wire coil or winding being retained in position upon the tube pending the soldering operation by the binding wire 3 located within the coil structure and fed together with the winding.

In carrying out the present invention, a binding wire is used which is of flattened cross section and has a width such that it fits snugly in the bases or inner ends of the wire loops whereby the binding wire under tension provides a substantial area of contact with the loops. Simultaneously with the application of the wire winding and binding wire, there is also fed through the wire coil a bonding wire 4 of solder or brazing metal, said bonding wire also having a flattened cross section and having a width at least equal to and preferably greater than the width of the binding wire so that the latter is shrouded or covered by the bonding wire. In the arrangement illustrated, the bonding wire has a width closely approaching the internal width of the wire loops so that said loops have a restraining effect on the bonding wire and prevent it slipping off the binding wire during either the winding process or subsequent handling.

After a length of tube has been wound the ends of the binding wire, and if desired the ends of the bonding wire, are temporarily secured to the tube and the assembly is then fed through an induction heating coil indicated at 5. As the assembly traverses the coil the solder or bonding wire, being unscreened, is heated rapidly, becomes molten, and by capillary action flows over the binding wire and between the roots of the adjacent loops. As the binding wire is screened by the solder wire, it rises in temperature only at approximately the same rate as the temperature in the tube wall, and by adjusting the rate of passage of the wound tube through the heating coil such that by the time adequate flow of solder has taken place the heated portion is leaving the heating zone, overheating and loss of tension in the binding wire is effectively prevented.

It will be understood that the binding wire and the bonding need not necessarily both be of flattened cross section. For example, a flat bonding wire may be used in conjunction with a binding wire of other cross section provided the relative widths and dispositions of the two wires is such that the binding wire is screened by the bonding wire.

The rigidity of the attachment of the wire loops to the tube may in all instances be increased by providing a shallow helical groove 6 in the outer surface of the tube, into which the bases of the loops fit snugly. Heat transmission across the joint is also improved by this arrangement. If desired, an additional solder or like bonding wire 7 may be wound upon the tube simultaneously with the wire winding and in the spaces between the coils to provide larger fillets of solder between the coils and the tube and thereby a still further increase of heat transmission across the joint.

Depending upon the materials involved, the tube may be heated in an inert or a reducing atmosphere, either to prevent oxidation of the metals, or to provide a fluxing action to improve the quality of the joint.

I claim:

1. A method for use in making a heat exchanger having a heat transmitting tube and a heat transfer wire coil encircling said tube for increasing the heat exchange capacity of said heat exchanger, the steps of affixing the wire coil to said tube comprising forming said coil with a hollow loop cross section, winding said wire coil helically around said tube, providing a binding wire of substantially flattened cross section, providing a bonding wire having a cross sectional width at least equal to that of said binding wire and approaching the internal width of the loop cross section of said wire coil, feeding the binding and bonding wires through the wire coil with the bonding wire superimposed upon the outwardly facing surface of said binding wire in screening relation thereto and having its outwardly facing surface exposed to the interior of said wire coil and its edges in abutment with the walls of said wire coil whereby the wire coil exerts a restraining force on the bonding wire to prevent displacement thereof relative to said binding wire, and thereafter passing said tube and the wire coil assembly through a high frequency induction coil and heating the wire coil assembly to cause the bonding wire to melt and flow over the base of the wire loop cross section of said wire coil and surface of said tube wherein the bonding wire screens the binding wire from the electric magnetic field produced by the induction coil to maintain the temperature of the binding wire substantially equal to the temperature of said tube as it is passed through said induction coil.

2. The method as defined in claim 1, wherein a second bonding wire is fed into the space between the winding of the wire coil to thereby provide additional bonding metal.

3. The method as defined in claim 1, including the step of providing said tube with grooves in the outer surface thereof to receive the bases of the loops of said wire coil.

4. The method as defined in claim 1, wherein the heating and bonding step is carried out in an inert atmosphere.

5. The method as defined in claim 1, wherein said binding and bonding wires are fed through said wire coil simultaneously with the winding of said coil around said tube.

6. The method as defined in claim 1, wherein the heating and bonding step is carried out in a reducing atmosphere.

References Cited in the file of this patent

UNITED STATES PATENTS

| | | |
|---|---|---|
| 1,960,305 | Emmons et al. | May 29, 1934 |
| 2,308,319 | Stanton | Jan. 12, 1943 |
| 2,503,429 | Ziegler | Apr. 11, 1950 |